United States Patent
Masubuchi et al.

(10) Patent No.: US 10,619,547 B2
(45) Date of Patent: Apr. 14, 2020

(54) DIAGNOSIS APPARATUS AND DIAGNOSIS METHOD FOR NOX SENSOR

(71) Applicant: TOYOTA JIDOSHA KABUSHIKI KAISHA, Toyota-shi, Aichi-ken (JP)

(72) Inventors: Masahiko Masubuchi, Mishima (JP); Toru Kidokoro, Hadano (JP); Yasushi Iwazaki, Ebina (JP); Koji Hagiwara, Suntou-gun (JP); Hiroshi Miyamoto, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 218 days.

(21) Appl. No.: 15/917,381

(22) Filed: Mar. 9, 2018

(65) Prior Publication Data
US 2018/0258821 A1    Sep. 13, 2018

(30) Foreign Application Priority Data

Mar. 9, 2017 (JP) .................................. 2017-045220

(51) Int. Cl.
*F01N 11/00* (2006.01)
*F01N 3/20* (2006.01)
(Continued)

(52) U.S. Cl.
CPC .............. *F01N 11/00* (2013.01); *F01N 3/208* (2013.01); *F01N 13/008* (2013.01);
(Continued)

(58) Field of Classification Search
CPC ........ F01N 11/00; F01N 13/008; F01N 3/208; F01N 2900/1602; F01N 2900/1616;
(Continued)

(56) References Cited

U.S. PATENT DOCUMENTS 8,418,438 B2 * 4/2013 Shimomura ............ F01N 3/208
60/277
8,813,546 B2 * 8/2014 Takahashi ........... F02D 41/1461
73/114.71

(Continued)

FOREIGN PATENT DOCUMENTS

JP       2008-133780      6/2008
JP       2010-107227      5/2010
(Continued)

*Primary Examiner* — Freddie Kirkland, III
(74) *Attorney, Agent, or Firm* — Finnegan, Henderson, Farabow, Garrett & Dunner, LLP

(57) ABSTRACT

An object is to prevent a wrong diagnosis from being made in diagnosis of an NOx sensor provided downstream of an SCR catalyst. A diagnosis apparatus is applied to an NOx sensor provided in an exhaust system including an SCR catalyst, a reducing agent supply device, an NOx sensor, an exhaust gas purification device provided upstream of the SCR catalyst, and a controller configured to raise the temperature of the exhaust gas purification device and control supply of reducing agent so as to adjust the ammonia adsorption amount to a specific amount. The controller is further configured to perform diagnosis of the NOx sensor on the basis of the concentration of ammonia slipping out of the SCR catalyst and disallow diagnosis of the NOx sensor since the ammonia adsorption amount is adjusted to the specific amount until a specific time elapses.

20 Claims, 7 Drawing Sheets

(51) Int. Cl.
*F01N 13/00* (2010.01)
*F01N 3/08* (2006.01)
*G01M 15/10* (2006.01)

(52) U.S. Cl.
CPC .......... *F01N 3/0814* (2013.01); *F01N 3/0842* (2013.01); *F01N 13/009* (2014.06); *F01N 2560/026* (2013.01); *F01N 2570/14* (2013.01); *F01N 2610/02* (2013.01); *F01N 2900/0422* (2013.01); *F01N 2900/1602* (2013.01); *F01N 2900/1616* (2013.01); *G01M 15/102* (2013.01); *Y02T 10/24* (2013.01); *Y02T 10/47* (2013.01)

(58) Field of Classification Search
CPC .... F01N 13/009; F01N 3/0842; F01N 3/0814; F01N 2900/0422; F01N 2570/14; F01N 2610/02; F01N 2560/026; Y02T 10/47; Y02T 10/24; G01M 15/102
See application file for complete search history.

(56) References Cited

U.S. PATENT DOCUMENTS

| | | | |
|---|---|---|---|
| 9,453,451 B2 * | 9/2016 | Matsumoto | F01N 3/2066 |
| 9,624,804 B2 * | 4/2017 | Matsumoto | F01N 3/2066 |
| 2010/0257844 A1 | 10/2010 | Shimomura et al. | |
| 2013/0104638 A1 | 5/2013 | Takahashi et al. | |

FOREIGN PATENT DOCUMENTS

| | | |
|---|---|---|
| JP | 2010-248963 | 11/2010 |
| JP | 2012-17686 | 1/2012 |
| JP | 2015-1206 | 1/2015 |

* cited by examiner

[FIG. 1]
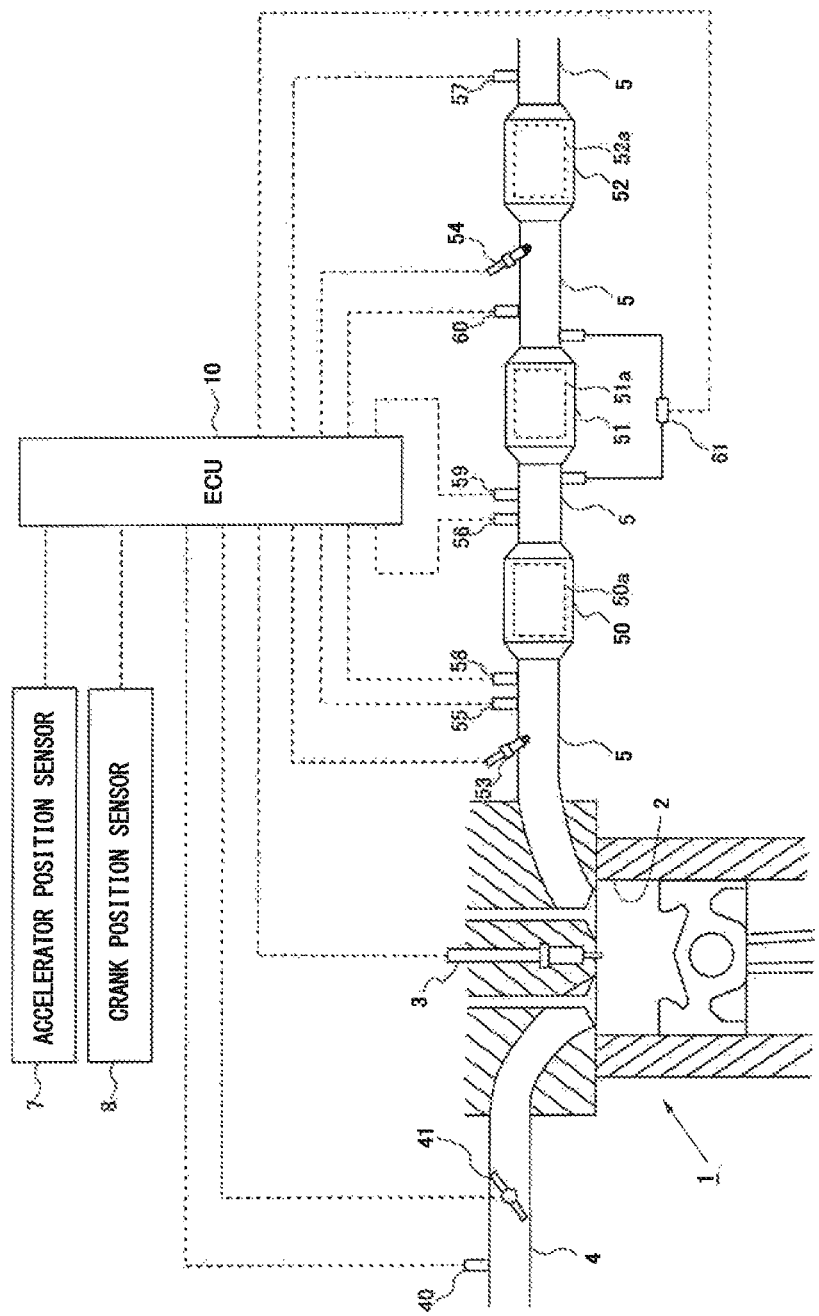

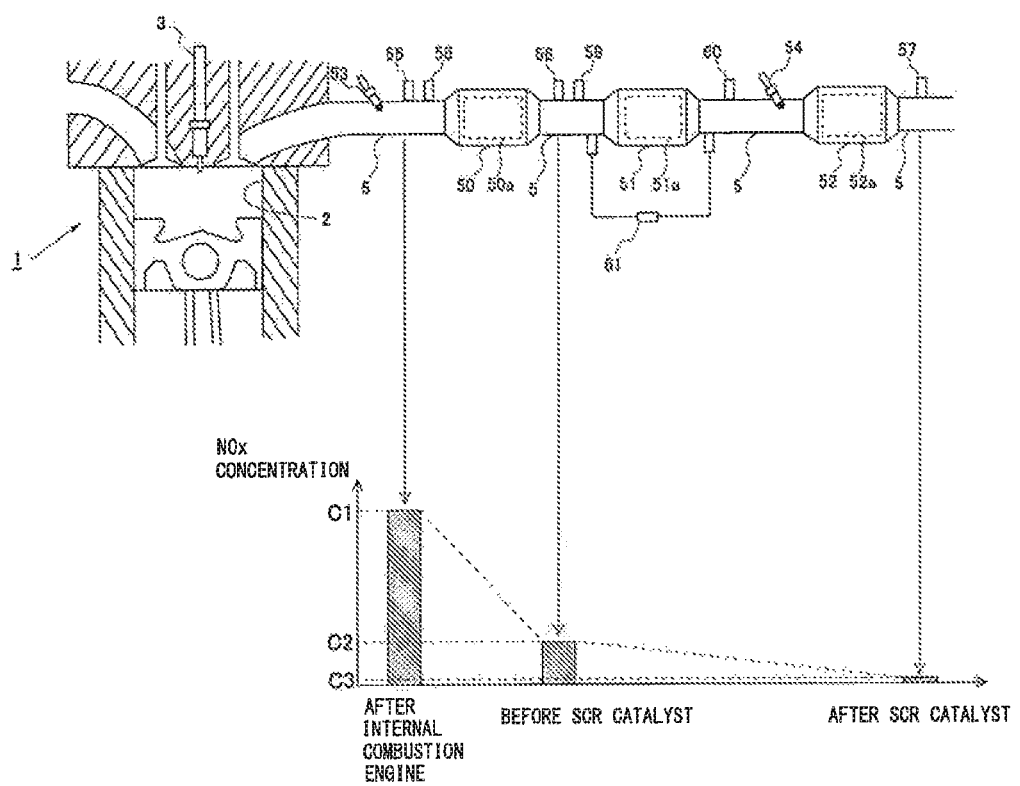

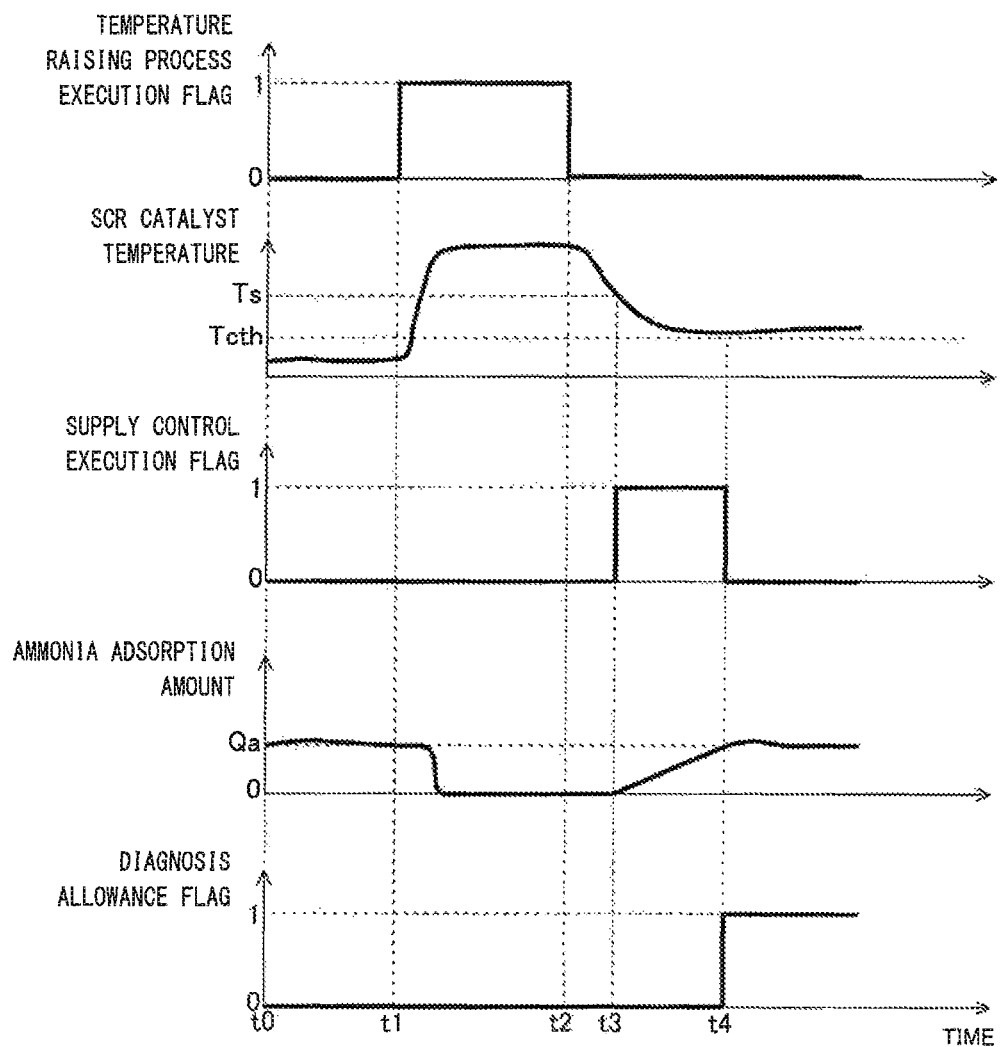

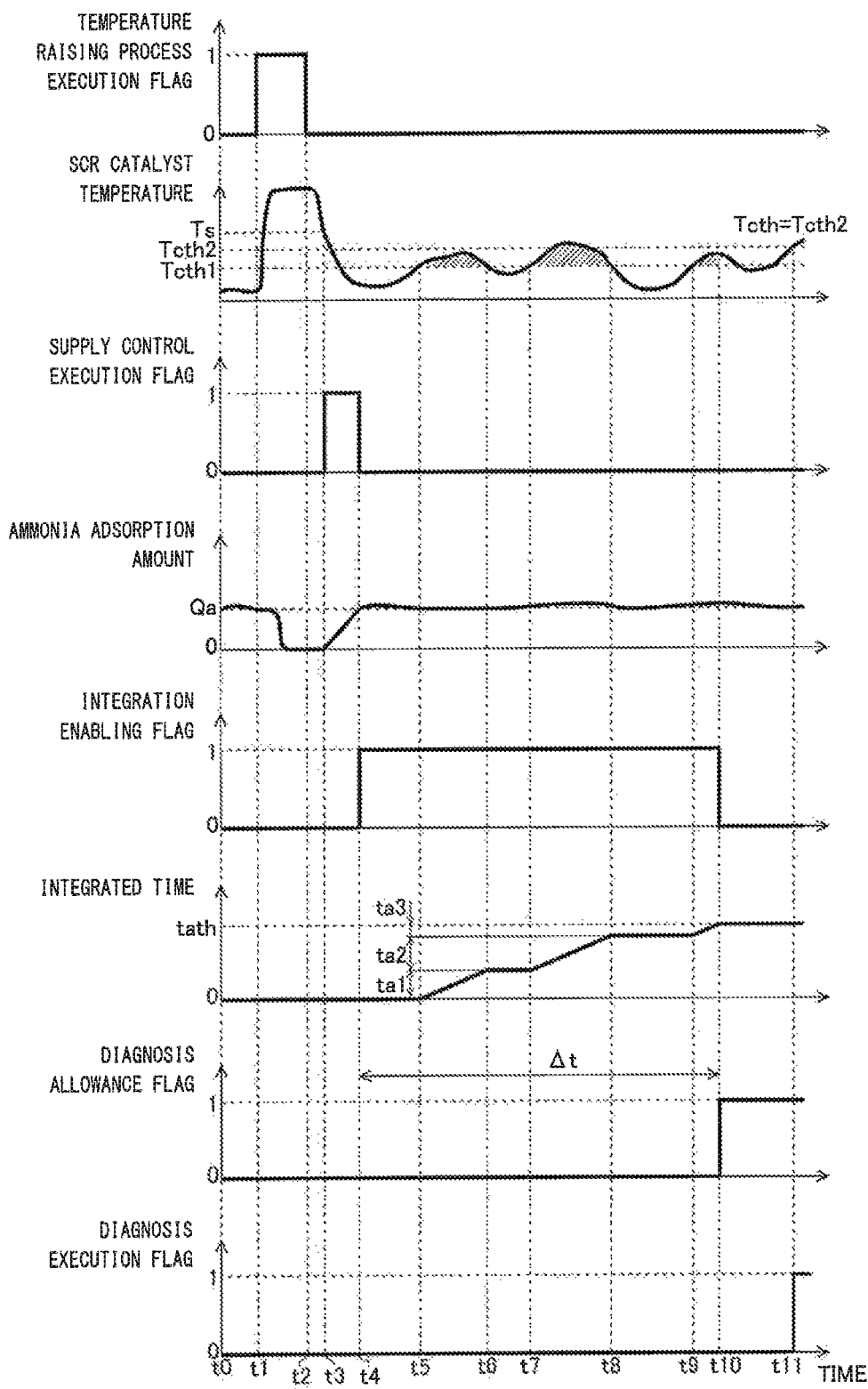

[FIG. 5A]
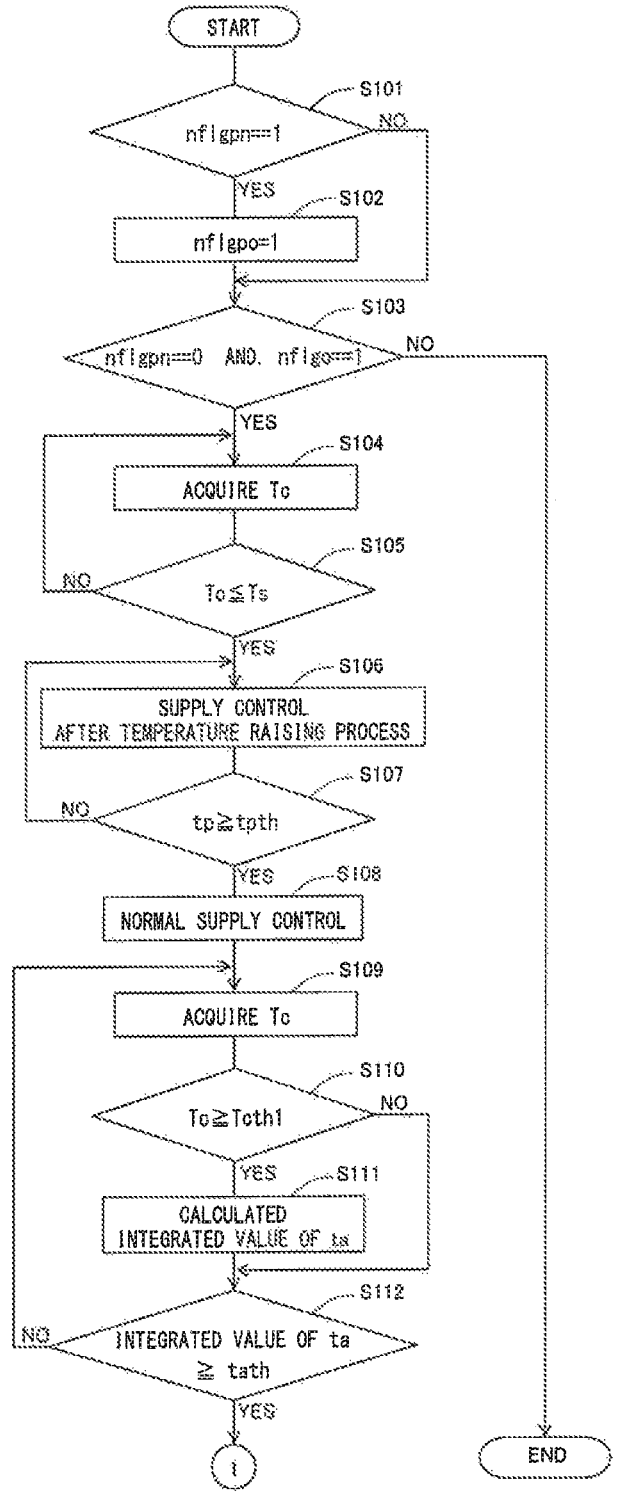

[FIG. 5B]
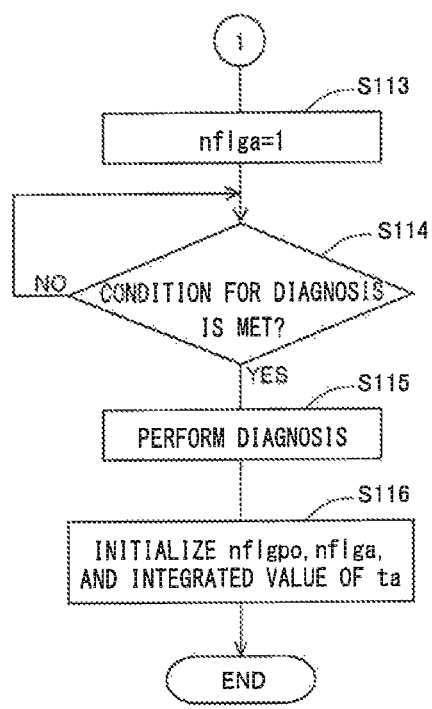

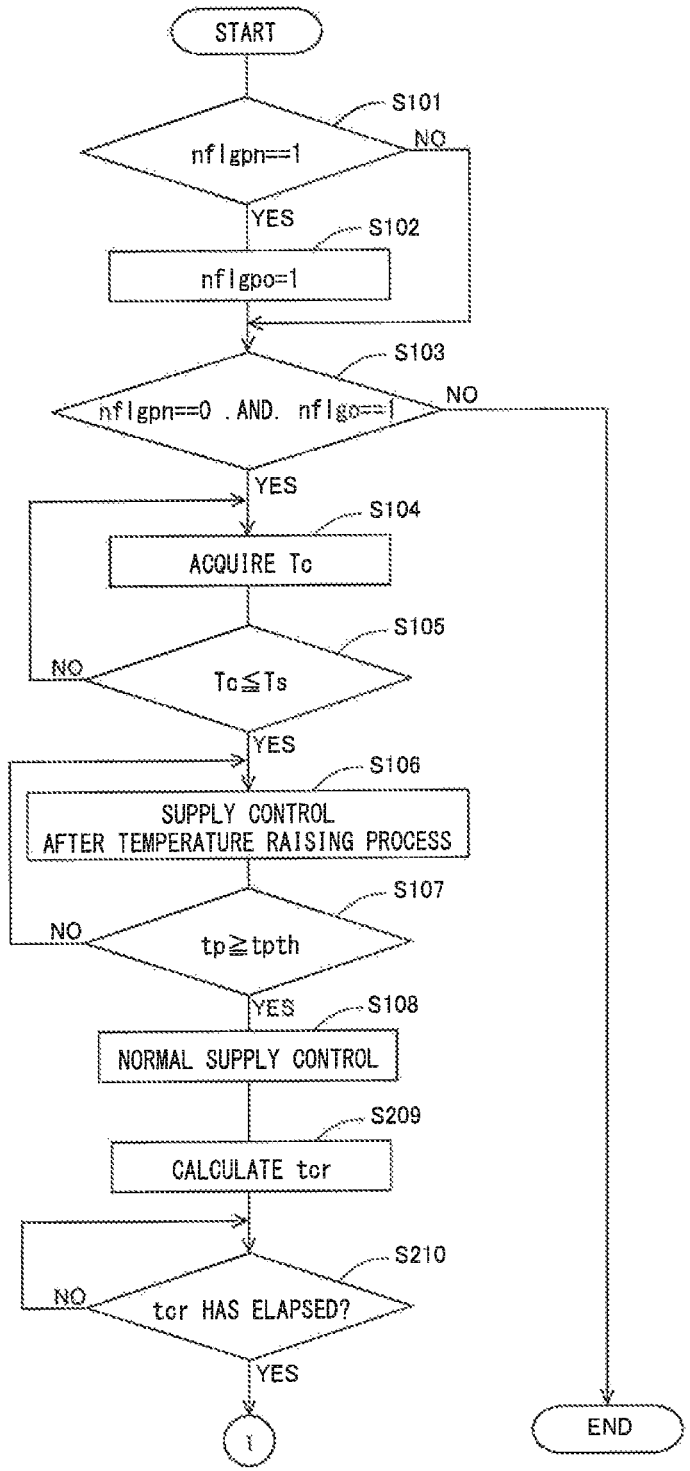
[FIG. 6]

DIAGNOSIS APPARATUS AND DIAGNOSIS METHOD FOR NOX SENSOR

CROSS-REFERENCE TO RELATED APPLICATIONS

This application claims priority to Japanese Patent Application No. 2017-045220 filed on Mar. 9, 2017, the entire contents of which are incorporated by reference.

BACKGROUND

Technical Field

The present disclosure relates to a diagnosis apparatus and diagnosis method for an NOx sensor.

Description of the Related Art

There are known exhaust systems provided with a selective catalytic reduction NOx catalyst (which will also be referred to as "SCR catalyst" hereinafter) that reduces NOx contained in exhaust gas discharged from an internal combustion engine using ammonia as a reducing agent, a reducing agent supply device that supplies ammonia or a precursor of ammonia as a reducing agent, and an NOx sensor (or downstream NOx sensor) provided downstream of the SCR catalyst.

It is known to diagnose abnormality of the downstream NOx sensor in such a system on the basis of the output of the downstream NOx sensor at the time when the quantity of reducing agent supplied is changed (see Patent Literature 1).

Patent Literature 2 discloses a technique of failure diagnosis for the downstream NOx sensor in an exhaust system further having a filter provided upstream of the SCR catalyst. In this technique, the supply of reducing agent is suspended while regeneration of the filter is being performed. Moreover, while regeneration of the filter is being performed, the quantity of NOx flowing into the SCR catalyst is calculated on the basis of the output of an NOx sensor (or upstream NOx sensor) provided upstream of the SCR catalyst. When the integrated value of the quantity of NOx calculated in this way reaches a predetermined value, a determination as to failure of the downstream NOx sensor is made on the basis of the output of the upstream NOx sensor and the output of the downstream NOx sensor.

CITATION LIST

Patent Literature

Patent Literature 1: Japanese Patent Application Laid-Open No. 2010-248963
Patent Literature 2: Japanese Patent Application Laid-Open No. 2015-001206
Patent Literature 3: Japanese Patent Application Laid-Open No. 2012-017686
Patent Literature 4: Japanese Patent Application Laid-Open No. 2008-133780
Patent Literature 5: Japanese Patent Application Laid-Open No. 2010-107227

SUMMARY

NOx sensors tend to have sensitivity not only to NOx but also to ammonia. In that sense, NOx sensors that measure the NOx concentration in the exhaust gas may be considered to be sensors that sense ammonia also as NOx. Diagnosis of such NOx sensors can be performed on the basis of the concentration of ammonia slipping out of the SCR catalyst.

In the case of exhaust systems provided with an exhaust gas purification device provided upstream of the SCR catalyst, when a temperature raising process for raising the temperature of the exhaust gas purification device is performed, the temperature of the SCR catalyst is also raised consequently. Then, a large part of ammonia adsorbed in the SCR catalyst tends to slip into the exhaust passage downstream of the SCR catalyst. The occurrence of such ammonia slip is apt to lead to a decrease in the NOx removal rate with the SCR catalyst. As a countermeasure, when the temperature raising process is performed, a reducing agent is supplied to the SCR catalyst to recover the state in which a specific amount of ammonia is adsorbed in the SCR catalyst.

It has been discovered that when the state in which a specific amount of ammonia is adsorbed in the SCR catalyst is recovered after the aforementioned temperature raising process, the ammonia adsorbed in the SCR catalyst is distributed along the direction of the exhaust gas flow in such an uneven manner that a large part of ammonia is present in the upstream portion thereof, and even when the temperature of the SCR catalyst reaches a temperature that can cause ammonia slip, it takes a certain length of time until ammonia adsorbed in the SCR catalyst tends to slip into the downstream exhaust passage. Therefore, if diagnosis of the NOx sensor, which can sense ammonia in the exhaust gas also as NOx, is performed on the basis of the concentration of ammonia slipping out of the SCR catalyst during the lapse of the aforementioned certain length of time, the diagnosis of the NOx sensor can be inaccurate. Therefore, if diagnosis of the NOx sensor is performed during the lapse of the aforementioned length of time, there is a possibility that a wrong diagnosis may be made.

The present disclosure has been made in view of the above-described problem, and an object of the present disclosure is to prevent a wrong diagnosis from being made in diagnosis of an NOx sensor provided downstream of an SCR catalyst.

Solution to Problem

To solve the above problem, according to the present disclosure there is provided a diagnosis apparatus for an NOx sensor applied to an exhaust system including a selective catalytic reduction NOx catalyst provided in an exhaust passage of an internal combustion engine to reduce NOx in exhaust gas by ammonia, a reducing agent supply device that adds ammonia or a precursor of ammonia as a reducing agent to exhaust gas upstream of said selective catalytic reduction NOx catalyst, an NOx sensor provided in said exhaust passage downstream of said selective catalytic reduction NOx catalyst, an exhaust gas purification device provided in said exhaust passage upstream of said selective catalytic reduction NOx catalyst, and a controller comprising at least one processor configured to perform a temperature raising process for raising the temperature of said exhaust gas purification device and control supply of said reducing agent by said reducing agent supply device after said temperature raising process is performed so as to make the ammonia adsorption amount defined as the amount of ammonia adsorbed in said selective catalytic reduction NOx catalyst equal to a specific amount smaller than the saturated amount of said ammonia adsorption amount. The controller is further configured to: perform diagnosis of said NOx sensor on the basis of the concentration of ammonia slipping out of said selective catalytic reduction NOx catalyst when the temperature of said selective catalytic reduction NOx catalyst is equal to or higher than a specific temperature; and disallow diagnosis of said NOx sensor since said ammonia adsorption amount is made equal to said specific amount until a specific time elapses.

The NOx sensor that the above-described exhaust system has can sense ammonia in the exhaust gas also as NOx. When the temperature of the SCR catalyst is higher than a certain temperature, ammonia slip can occur. If the specific temperature is defined as a temperature of the SCR catalyst at which ammonia slip can occur, the above-described diagnosis apparatus for an NOx sensor performs diagnosis of the NOx sensor on the basis of the concentration of ammonia slipping out of the SCR catalyst when the temperature of the SCR catalyst is higher than the specific temperature.

In the above-described exhaust system, the controller performs a temperature raising process. In cases where, for example, a filter is used as the exhaust gas purification device, the temperature raising process may be, for example, the processing of oxidizing and removing PM deposited in the filter (PM regeneration process). Alternatively, in cases where, for example, a NOx storage reduction catalyst is used as the exhaust gas purification device, the temperature raising process may be the process of oxidizing and removing SOx (S regeneration process) or thermally desorbing NOx (NOx purge process) performed for the NOx storage reduction catalyst. In such temperature raising processes, the temperature of the exhaust gas purification device provided upstream of the SCR catalyst becomes relatively high. Consequently, when the temperature raising process is performed, exhaust gas having a relatively high temperature is discharged from the exhaust gas purification device to the exhaust passage downstream of the exhaust gas purification device. This exhaust gas flows into the SCR catalyst to raise the temperature of the SCR catalyst. When the temperature of the SCR catalyst rises with the temperature raising process, a large amount of ammonia adsorbed in the SCR catalyst tends to slip into the exhaust passage downstream of the SCR catalyst.

If ammonia slips out of the SCR catalyst with the temperature raising process, the NOx removal rate with the SCR catalyst is apt to decrease. Then, after the temperature raising process is performed, the controller controls supply of reducing agent by the reducing agent supply device to increase the ammonia adsorption amount. Thus, the ammonia adsorption amount is adjusted to the specific amount, so that NOx can be removed using the specific amount of ammonia. This specific amount is an amount smaller than the saturated ammonia adsorption amount. This specific amount is, for example, an ammonia adsorption amount necessary for removal of NOx by the SCR catalyst. Alternatively, this specific amount may be an ammonia adsorption amount necessary for removal of NOx by the SCR catalyst plus a certain margin. In order to adjust the ammonia adsorption amount to the specific amount as quickly as possible, the controller may make the flow rate of the reducing agent supplied by the reducing agent supply device relatively high when controlling the supply of reducing agent.

If ammonia slips out of the SCR catalyst with the temperature raising process, the ammonia adsorption amount tends to become very small. When the reducing agent is supplied to the SCR catalyst with such a very small ammonia adsorption amount in such a way as to adjust the ammonia adsorption amount to an amount smaller than the saturated amount, ammonia tends to be adsorbed in the upstream part of the SCR catalyst, which is such an SCR catalyst that is supported on a carrier and extends from the upstream part to the downstream part of the carrier along the direction of the exhaust gas flow therein and has a certain length in the direction of the exhaust gas flow. Thus, there arises an uneven distribution of adsorbed ammonia along the direction of the exhaust gas flow in the SCR catalyst. In this distribution, for example, the density of ammonia is highest in the vicinity of the upstream end of the SCR catalyst and decreases from the upstream end toward the downstream part. It should be noted that the expression "SCR catalyst with a very small adsorption amount" also refers to an SCR catalyst in which the ammonia adsorption amount is substantially equal to zero. However, the aforementioned situation is not limited to the situation in which the slip of ammonia out of the SCR catalyst with the temperature raising process makes the ammonia adsorption amount substantially equal to zero.

As described above, it has been discovered that when the controlled supply of reducing agent is performed by the controller after the slip of ammonia out of the SCR catalyst with the temperature raising process, there arises such an upstream-biased distribution of ammonia adsorbed in the SCR catalyst along the direction of the exhaust gas flow that a large part of ammonia is present in the upstream part of the SCR catalyst. It has also been discovered that due to this upstream-biased distribution, even when the temperature of the SCR catalyst reaches or exceeds the specific temperature after the ammonia adsorption amount is adjusted to the specific amount by the controlled supply of reducing agent by the controller, it takes some time until the ammonia adsorbed in the SCR catalyst tends to slip into the exhaust passage downstream of the SCR catalyst. This will be described specifically in the following.

When the temperature of the SCR catalyst reaches or exceeds the specific temperature, ammonia adsorbed in adsorption sites in the SCR catalyst is desorbed. The desorbed ammonia flows with the exhaust gas in the SCR catalyst, which has a certain length along the direction of the exhaust gas flow, to flow out into the exhaust passage downstream of the SCR catalyst. In the case of ammonia adsorbed in the upstream part of the SCR catalyst, after desorbed from adsorption sites in the upstream part of the SCR catalyst, it tends to be adsorbed in other adsorption sites located downstream of the original or previous adsorption sites before it flows out into the exhaust passage downstream of the SCR catalyst.

When ammonia is adsorbed in the SCR catalyst in the upstream-biased manner as described above, if the temperature of the SCR catalyst reaches or exceeds the specific temperature, ammonia desorbed from the original adsorption sites tends to be adsorbed and desorbed repeatedly to shift to the downstream part of the SCR catalyst, as it flows in the SCR catalyst with the exhaust gas. In that case, it takes some time for the ammonia to shift to the downstream part of the SCR catalyst. For this reason, it takes some time until ammonia adsorbed in the SCR catalyst tends to slip out into the exhaust passage downstream of the SCR catalyst after the ammonia adsorption amount is adjusted to the specific amount by the controlled supply of reducing agent by the controller. Since the specific amount is smaller than the saturated ammonia adsorption amount, the SCR catalyst is still capable of adsorbing ammonia even after the ammonia adsorption amount is adjusted to the specific amount by the controlled supply of reducing agent by the controller.

In the prior art disclosed in the cited literatures, no consideration is given to the above-described distribution of the adsorbed ammonia. Therefore, in cases where diagnosis of an NOx sensor is performed by the above-described diagnosis apparatus for an NOx sensor according to the technology disclosed in the cited literatures (which does not have the controller configured to disallow diagnosis of the NOx sensor according to the present disclosure), if the ammonia adsorption amount has been adjusted to the specific amount by the controlled supply of reducing agent by the controller after slip of ammonia out of the SCR catalyst with the temperature raising process, diagnosis of the NOx sensor is performed immediately when the temperature of the SCR catalyst reaches or exceeds the specific temperature. Thus, diagnosis of the NOx sensor can be performed during the period in which ammonia adsorbed in the SCR catalyst hardly slips into the exhaust passage downstream of the SCR catalyst though the temperature of the SCR catalyst is equal to or higher than the specific temperature. If, for example, diagnosis of the NOx sensor is performed on the assumption that ammonia slips out of the SCR catalyst, there is a possibility that a wrong diagnosis that the NOx sensor has an abnormality may be made because the quantity of ammonia calculated on the basis of the output of the NOx sensor can be substantially equal to zero during the aforementioned period. Thus, a wrong diagnosis is liable to be made with the technology disclosed in the cited literatures.

To prevent the above-described situation, the controller in the diagnosis apparatus for an NOx sensor according to the present disclosure is configured to disallow diagnosis of the NOx sensor since the ammonia adsorption amount is made equal to the specific amount until a specific time elapses. This specific time is the time taken since the ammonia adsorption amount is adjusted to the specific amount by the controlled supply of reducing agent by the controller until the upstream-biased distribution of ammonia adsorbed in the SCR catalyst is eliminated and ammonia adsorbed in the SCR catalyst tends to slip into the exhaust passage downstream of the SCR catalyst. During the lapse of this specific time, a wrong diagnosis can be made by diagnosis of an NOx sensor according to the technology disclosed in the cited literatures. In the case of the diagnosis apparatus for an NOx sensor according to the present disclosure, even when the ammonia adsorption amount is adjusted to the specific amount and the temperature of the SCR catalyst reaches or exceeds the specific temperature, diagnosis of the NOx sensor is disallowed during this specific period of time in which a wrong diagnosis can be made in diagnosing the NOx sensor. Another possible method of preventing the above-described wrong diagnosis is supplying the reducing agent in such a way as to make the ammonia adsorption amount saturated after the slip of ammonia out of the SCR catalyst with the temperature raising process. However, this tends to lead to a large quantity of ammonia slip in performing diagnosis of the NOx sensor. In the diagnosis apparatus for an NOx sensor according to the present disclosure, since the ammonia adsorption amount is adjusted to the specific amount smaller than the saturated amount after slip of ammonia out of the SCR catalyst with the temperature raising process, the quantity of ammonia slip with diagnosis of the NOx sensor is relatively small.

The diagnosis apparatus for an NOx sensor according to the present disclosure can prevent a wrong diagnosis from being made in diagnosing the NOx sensor by performing the above-described disallowing process by the controller to disallow diagnosis of the NOx sensor.

Said specific amount may be a value of said ammonia adsorption amount that is necessary for removal of NOx by said selective catalytic reduction NOx catalyst. With this feature, it is possible to make the quantity of ammonia slip with diagnosis of the NOx sensor as small as possible while maintaining a required removal rate in removing NOx flowing into the SCR catalyst.

The diagnosis apparatus for an NOx sensor according to the present disclosure, wherein said controller may be further configured to calculate said specific time on the basis of the temperature of said selective catalytic reduction NOx catalyst.

As described above, the specific time is the time taken since the ammonia adsorption amount is adjusted to the specific amount by the controlled supply of reducing agent by the controller until the upstream-biased distribution of ammonia adsorbed in the SCR catalyst is eliminated and ammonia adsorbed in the SCR catalyst tends to slip into the exhaust passage downstream of the SCR catalyst. The tendency of ammonia slip out of the SCR catalyst relates to the temperature of the SCR catalyst. The temperature of the SCR catalyst can change depending on the operation state of the internal combustion engine. Therefore, the controller may calculate the specific time as a variable time that can change depending on the operation state of the internal combustion engine on the basis of the temperature of the SCR catalyst that depends on the operation state of the internal combustion engine. Thus, the specific time can be determined appropriately to prevent a wrong diagnosis from being made in diagnosing the NOx sensor.

Said controller may calculate an integrated value of the time over which the temperature of said selective catalytic reduction NOx catalyst is equal to or higher than a specific first temperature after said ammonia adsorption amount is made equal to said specific amount by the controller and calculate said specific time as a time taken until said integrated value reaches or exceeds specific threshold.

The first specific temperature mentioned above is, for example, a temperature that allows the ammonia adsorbed in the SCR catalyst to be desorbed from adsorption sites and enables the ammonia adsorbed in the upstream part of the SCR catalyst to shift in the downstream direction. When the aforementioned integrated value reaches or exceeds the specific threshold, a state in which the ammonia adsorbed in the SCR catalyst tends to slip into the exhaust passage downstream of the SCR catalyst is established.

The higher the flow rate of exhaust gas discharged from said internal combustion engine is, the lower said first specific temperature may be made. Furthermore, the higher the flow rate of exhaust gas discharged from said internal combustion engine is, the smaller said specific threshold may be made.

As described above, ammonia flows in the SCR catalyst with the exhaust gas to shift to the downstream part of the SCR catalyst. The higher the flow rate of the exhaust gas discharged from the internal combustion engine (which will be also referred to as the "exhaust gas flow rate" hereinafter) is, the higher the flow rate of the exhaust gas flowing in the SCR catalyst is. Therefore, the higher the exhaust gas flow rate is, the more the ammonia adsorbed in the upstream part of the SCR catalyst is apt to shift in the downstream direction. Thus, the higher the exhaust gas flow rate is, the more the ammonia adsorbed in the SCR catalyst tends to slip into the exhaust passage downstream of the SCR catalyst.

The temperature of the SCR catalyst reaches or exceeds the first specific temperature more likely when the first specific temperature is low than when it is high. Therefore, the integrated value of the time over which the temperature of the SCR catalyst is equal to or higher than the specific first temperature is larger when the first specific temperature is low than when it is high. Therefore, when the higher the exhaust gas flow rate is, the lower the first specific temperature is made, the integrated value of the time over which the temperature of the SCR catalyst is equal to or higher than the specific first temperature reaches earlier than when the first specific temperature is not made lower. In consequence, the higher the exhaust gas flow rate is, the shorter the length of time over which diagnosis of the NOx sensor is disallowed is. The specific time tends to be calculated smaller when the specific threshold is small than when it is large. Therefore, when the higher the exhaust gas flow rate is, the smaller the specific threshold is made, the specific time tends to be calculated shorter than when the specific threshold is not made smaller. In consequence, the higher the exhaust gas flow rate is, the shorter the period of time over which diagnosis of the NOx sensor is disallowed is. As above, the specific time can be calculated appropriately taking into consideration the fact that the tendency of ammonia slip changes depending on the exhaust gas flow rate.

Said specific temperature may be a second specific temperature higher than said first specific temperature. In this case, said controller diagnoses the NOx sensor on the basis of the concentration of ammonia slipping out of said selective catalytic reduction NOx catalyst when the temperature of said selective catalytic reduction NOx catalyst is equal to or higher than the second specific temperature.

As described above, the specific temperature is a temperature of the SCR catalyst at which ammonia slip can occur. After the upstream-biased distribution of ammonia adsorbed in the SCR catalyst is eliminated and a state in which the ammonia adsorbed in the SCR catalyst tends to slip into the exhaust passage downstream of the SCR catalyst is established, ammonia slip can occur even when the temperature of the SCR catalyst reaches the first specific temperature. Therefore, the specific temperature may be set to the first specific temperature. The second specific temperature is a temperature higher than the first specific temperature. Therefore, when the temperature of the SCR catalyst reaches or exceeds the second specific temperature, ammonia slip is relatively apt to occur. Therefore, by setting the predetermined temperature to the second predetermined temperature in diagnosis of the NOx sensor by the controller, diagnosis of the NOx sensor can be carried out with relatively high accuracy.

The present disclosure can also be specified as a method of diagnosis of an NOx sensor performed by the diagnosis apparatus for the NOx sensor. The method of diagnosing an NOx sensor according to the present disclosure is applied to an exhaust system including a selective catalytic reduction NOx catalyst provided in an exhaust passage of an internal combustion engine to reduce NOx in exhaust gas by ammonia, a reducing agent supply device that adds ammonia or a precursor of ammonia as a reducing agent to exhaust gas upstream of said selective catalytic reduction NOx catalyst, an NOx sensor provided in said exhaust passage downstream of said selective catalytic reduction NOx catalyst, an exhaust gas purification device provided in said exhaust passage upstream of said selective catalytic reduction NOx catalyst, and a controller comprising at least one processor configured to perform a temperature raising process for raising the temperature of said exhaust gas purification device and control supply of said reducing agent by said reducing agent supply device after said temperature raising process is performed so as to make the ammonia adsorption amount defined as the amount of ammonia adsorbed in said selective catalytic reduction NOx catalyst equal to a specific amount smaller than the saturated amount of said ammonia adsorption amount. The method comprises the steps of: diagnosing said NOx sensor on the basis of the concentration of ammonia slipping out of said selective catalytic reduction NOx catalyst when the temperature of said selective catalytic reduction NOx catalyst is equal to or higher than a specific temperature; and disallowing diagnosis of said NOx sensor since said ammonia adsorption amount is made equal to said specific amount by said controller until a specific time elapses.

The apparatus and method according to the present disclosure can prevent a wrong diagnosis from being made in diagnosis of an NOx sensor provided downstream of an SCR catalyst.

BRIEF DESCRIPTION OF DRAWINGS

FIG. 1 is a diagram showing the general configuration of an internal combustion engine according to an embodiment of the present disclosure and its air-intake and exhaust systems.

FIG. 2 is a diagram showing the NOx concentration in the exhaust gas discharged from an internal combustion before flowing into an NSR catalyst, the NOx concentration in the exhaust gas after flowing out of the NSR catalyst and before flowing into an SCR catalyst, and the NOx concentration in the exhaust gas after flowing out of the SCR catalyst.

FIG. 3 shows changes with time of a temperature raising process execution flag, the SCR catalyst temperature, a supply control execution flag, the ammonia adsorption amount, and a diagnosis allowance flag when the temperature raising process and the supply control after temperature raising process are performed in the diagnosis of the NOx sensor according to the prior art disclosed in the cited literatures.

FIG. 4 shows changes with time of the temperature raising process execution flag, the SCR catalyst temperature, the supply control execution flag, the ammonia adsorption amount, an integration enabling flag, the integrated time of the high temperature waiting time, the diagnosis allowance flag, and a diagnosis execution flag when the temperature raising process, the supply control after temperature raising process, and the disallowing process are performed.

FIG. 5A is a first flow chart of a control flow executed in a diagnosis apparatus for an NOx sensor according to a first embodiment.

FIG. 5B is a second flow chart of the control flow executed in the diagnosis apparatus for an NOx sensor according to the first embodiment.

FIG. 6 is a flow chart of a control flow executed in a diagnosis apparatus for an NOx sensor according to a second embodiment.

DESCRIPTION OF EMBODIMENTS

In the following, modes for carrying out the present disclosure will be specifically described as embodiments for illustrative purposes with reference to the drawings. It should be understood that the dimensions, materials, shapes, relative arrangements, and other features of the components that will be described in connection with the embodiments are not intended to limit the technical scope of the present disclosure only to them, unless stated otherwise.

First Embodiment (Configuration of Internal Combustion Engine and Air-Intake and Exhaust Systems Thereof)

FIG. 1 is a diagram showing the general configuration of an internal combustion engine according to an embodiment and its air-intake and exhaust systems. The internal combustion engine 1 shown in FIG. 1 is a compression-ignition internal combustion engine (diesel engine). It should be understood that present disclosure can also be applied to a spark-ignition lean-burn internal combustion engine that uses gasoline or the like as fuel.

The internal combustion engine 1 is provided with a fuel injection valve 3 that injects fuel into a cylinder 2. If the internal combustion engine 1 is a spark-ignition internal combustion engine, the fuel injection valve 3 may be adapted to inject fuel into an intake port.

The internal combustion engine 1 is connected with an intake passage 4. The intake passage 4 is provided with an air flow meter 40 and a throttle valve 41. The air-flow meter 40 outputs an electrical signal representing the quantity (i.e. mass) of intake air flowing in the intake passage 4. The throttle valve 41 is provided in the intake passage 4 downstream of the air flow meter 40. The throttle valve 41 is capable of varying the channel cross sectional area in the intake passage 4 to regulate the intake air-quantity of the internal combustion engine 1.

The internal combustion engine 1 is connected with an exhaust passage 5. The exhaust passage 5 is provided with a first catalyst casing 50. The first catalyst casing 50 houses a NOx storage reduction catalyst 50a (which will also be referred to as the "NSR catalyst 50a" hereinafter). The NSR catalyst 50a chemically stores or physically adsorbs NOx in the exhaust gas when the air-fuel ratio of the exhaust gas is a lean air-fuel ratio higher than the stoichiometric air-fuel ratio, and releases NOx and promotes the reaction of the released NOx and reductive components in the exhaust gas, such as hydrocarbon (HC) and/or carbon monoxide (CO) in the exhaust gas when the air-fuel ratio of the exhaust gas is a rich air-fuel ratio lower than the stoichiometric air-fuel ratio. The exhaust passage 5 is further provided with a fuel addition valve 53 arranged upstream of the first catalyst casing 50. The fuel addition valve 53 is capable of adding fuel to the exhaust gas flowing in the exhaust passage 5. Addition of fuel by the fuel addition valve 53 can make the temperature of the NSR catalyst 50a high and make the atmosphere around the NSR catalyst rich, thereby oxidizing and removing Sox from the NSR catalyst 50a (S regeneration) or thermally desorbing NOx from the NSR catalyst 50a (NOx purge). In this embodiment, the NSP catalyst 50a corresponds to the exhaust gas purification device according to the present disclosure.

The exhaust passage 5 upstream of the first catalyst sensor 50 is provided with a first NOx sensor 55 and a first temperature sensor 58, and the exhaust passage 5 downstream of the first catalyst casing 50 is provided with a second NOx sensor 56 and a second temperature sensor 59. The first NOx sensor 55, the second NOx sensor 56, and a third NOx sensor 57 described later output an electrical signal representing the NOx concentration in the exhaust gas. The first temperature sensor 58, the second temperature sensor 59, and a third temperature sensor 60 described later output an electrical signal representing the temperature of the exhaust gas. The first NOx sensor 55 and the first temperature sensor 58 measure the NOx concentration and the temperature of the exhaust gas flowing into the NSR catalyst 50a. The second NOx sensor 56 and the second temperature sensor 59 measure respectively the NOx concentration and the temperature of the exhaust gas flowing out of the NSR catalyst 50a.

The exhaust passage 5 downstream of the first catalyst casing 50 is provided with a filter casing 51. The filter casing 51 houses a particulate filter 51a (which also be simply referred to as the "filter 51a" hereinafter). The filter 51a traps PM (particulate matter) in the exhaust gas. The exhaust passage 5 is also provided with a differential pressure sensor 61. The differential pressure sensor 61 outputs an electrical signal representing the differential exhaust gas pressure across the filter casing 51. This differential pressure will also be referred to as the "filter differential pressure" hereinafter. When the filter differential pressure measured by the differential pressure sensor 61 reaches or exceeds a predetermined differential pressure, the processing of oxidizing and removing PM deposited in the filter 51a (or PM regeneration process) is performed. In the PM regeneration process, PM is oxidized by the fuel added through the fuel addition valve 53. In this embodiment, the filter 51a also corresponds to the exhaust gas purification device according to the present disclosure.

The exhaust passage 5 downstream of the filter casing 51 is provided with a second catalyst casing 52. The second catalyst casing 52 houses a selective catalytic reduction NOx catalyst 52a, which will also be referred to as the SCR catalyst 52a" hereinafter. The SCR catalyst 52a has the function of reducing NOx in the exhaust gas using ammonia as a reducing agent. The exhaust passage 5 upstream of the SCR catalyst 52a is provided with a urea solution addition valve 54. The urea solution addition valve 54 adds urea solution to the exhaust gas flowing in the exhaust passage 5. The urea solution added by the urea solution addition valve 54 is supplied to the SCR catalyst 52a. Thus, urea as a precursor of ammonia is supplied to the SCR catalyst 52a. The supplied urea is hydrolyzed to produce ammonia, which then is adsorbed by the SCR catalyst 52a. The ammonia adsorbed in the SCR catalyst 52a serves as a reducing agent to reduce NOx in the exhaust gas. The urea solution addition valve 54 may be replaced by a ammonia addition valve that can add ammonia gas to the exhaust gas. In this embodiment, the urea solution addition valve 54 or the ammonia addition valve corresponds to the reducing agent supply device according to the present disclosure.

The exhaust passage 5 upstream of the second catalyst casing 52 is provided with the third temperature sensor 60, and the exhaust passage 5 downstream of the second catalyst casing 52 is provided with the third NOx sensor 57. The third temperature sensor 60 measures the temperature of the exhaust gas flowing into the SCR catalyst 52a. The NOx sensor used in this embodiment is a sensor that measures the NOx concentration in the exhaust gas and can sense ammonia also as ammonia. Therefore, the third NOx sensor 57 outputs an electrical signal representing the combined concentration of NOx and ammonia in the exhaust as downstream of the SCR catalyst 52a. In this embodiment, the third NOx sensor 57 provided in the exhaust passage 5 downstream of the second catalyst casing 52 corresponds to the NOx sensor according to the present disclosure.

An electronic control unit (ECU) 10 is provided for the internal combustion engine 1. The ECU 10 is a unit that controls the operation state of the internal combustion engine 1. The ECU 10 is electrically connected with various sensors such as an accelerator position sensor 7 and a crank position sensor 8 as well as the aforementioned air flow meter 40, the first NOx sensor 55, the second NOx sensor 56, the third NOx sensor 57, the first temperature sensor 58, the second temperature sensor 59, the third temperature sensor 60, and the differential pressure sensor 61. The accelerator position sensor 7 outputs an electrical signal representing the amount of operation of the accelerator pedal (or the accelerator opening degree), which is not shown in the drawings. The crank position sensor 8 outputs an electrical signal representing the rotational position of the engine output shaft (or the crankshaft) of the internal combustion engine 1. The output signals of these sensors are input to the ECU 10. The ECU 10 calculates the engine load of the internal combustion engine 1 on the basis of the output signal of the accelerator position sensor 7 and calculates the engine speed of the internal combustion engine 1 on the basis of the output signal of the crank position sensor 8. Moreover, the ECU 10 estimates the flow rate of the exhaust gas discharged from the internal combustion engine 1 on the basis of the output value of the air flow meter 40 and estimates the temperature of the SCR catalyst 52a on the basis of the output value of the third temperature sensor 60. The flow rate of the exhaust gas discharged from the internal combustion engine 1 will be also referred to as the "exhaust gas flow rate", and the temperature of the SCR catalyst 52a will be also referred to as the "SCR catalyst temperature" hereinafter. While the third temperature sensor 60 is provided in the exhaust passage 5 between the filter casing 51 and the second catalyst casing 52 in the illustrative configuration shown in FIG. 1, the third temperature sensor 60 may be arranged downstream of the second casing 52 alternatively. If the third temperature sensor 60 is arranged downstream of the second catalyst casing 52 also, the ECU 10 can estimate the SCR catalyst temperature on the basis of the output value of the third temperature Sensor 60.

The ECU 10 is also electrically connected with various components including the fuel injection valve 3, the throttle valve 41, the fuel addition valve 53, and the urea solution addition valve 54. These components are controlled by the ECU 10. For example, when the ECU 10 detects from the output of the differential pressure sensor 61 that the filter differential pressure reaches or exceeds a predetermined differential pressure, it executes PM regeneration process by causing the fuel addition valve 53 to add fuel. When a predetermined condition is met, the ECU 10 executes S regeneration process or NOx purge process for the NSR catalyst 50a by causing the fuel addition valve 53 to add fuel. The execution of these processes lead to a rise in the temperature of the filter 51a and the NSR catalyst 50a, which correspond to the exhaust gas purification device according to the present disclosure. Such a process that leads to an increase in the temperature of the filter 51a and the NSR catalyst 50a will be referred to as the "temperature raising process". In executing the temperature raising process, the ECU 10 functions as the controller according to the present disclosure.

(Diagnosis of NOx Sensor Based on Ammonia Slip)

Now, we will describe the NOx concentration measured by the first NOx sensor 55, the second NOx sensor 56, and the third NOx sensor 57 in the exhaust system having the NSR catalyst 50a, the filter 51a, and the SCR catalyst 52a according to the embodiment with reference to FIG. 2. FIG. 2 is a diagram showing the NOx concentration in the exhaust gas discharged from the internal combustion 1 before flowing into the NSR catalyst 50 (measured by the first NOx sensor 55), the NOx concentration in the exhaust gas after flowing out of the NSR catalyst 50a and before flowing into the SCR catalyst 52a (measured by the second NOx sensor 56), and the NOx concentration in the exhaust gas after flowing out of the SCR catalyst 52a (measured by the third NOx sensor 57) in a case where the exhaust gas discharged from the internal combustion engine 1 flows down the exhaust passage 5 through the NSR catalyst 50a, the filter 51a, and the SCR catalyst 52 in order.

As shown in FIG. 2, NOx (at concentration C1) discharged from the internal combustion engine 1 is stored, adsorbed, or reduced by the NSR catalyst 50a for the most part, and the NOx concentration measured in the region downstream of the NSR catalyst 50a and upstream of the SCR catalyst 52a drops to concentration C2. Moreover, NOx is further reduced by the SCR catalyst 52a, and the NOx concentration in the region downstream of the SCR catalyst 52a (concentration C3) is very low.

As above, in the exhaust system according to the embodiment, the NOx concentration in the exhaust gas downstream of the SCR catalyst 52a is very low. Since the third NOx sensor 57, corresponding to the NOx sensor according to the present disclosure, is provided in the exhaust passage 5 downstream of the SCR catalyst 52a, the attempt of diagnosing the third NOx sensor 57 on the basis of the NOx concentration in the exhaust gas flowing out of the SCR catalyst 52a may fail, or even if not fails, the accuracy of diagnosis tends to be low, because the NOx concentration measured by the third NOx sensor 57 is very low.

To solve the above problem, the ECU 10 is configured to perform diagnosis of the third NOx sensor 57 on the basis of the concentration of ammonia slipping out of the SCR catalyst 52a at a time when the SCR catalyst temperature is equal to or higher than a specific temperature. As described above, the third NOx sensor 57 is a sensor that can also sense ammonia as NOx, and it outputs an electrical signal representing the combined concentration of NOx and ammonia in the exhaust gas in the region downstream of the SCR catalyst 52a. Ammonia produced from urea solution added by the urea solution addition valve 54 is adsorbed in the SCR catalyst 52a. When the SCR catalyst temperature is equal to or higher than a specific temperature, ammonia adsorbed in the SCR catalyst 52a can flow into the exhaust passage 5 downstream of the SCR catalyst 52a. Therefore, in the case where the exhaust system is configured in such a way that the NOx concentration in the exhaust gas downstream of the SCR catalyst 52a is very small, it is easy to perform diagnosis of the third NOx sensor 57 using the ammonia slipping out of the SCR catalyst 52a. In performing the diagnosis of the third NOx sensor 57, the ECU 10 functions as the controller according to the present disclosure.

(Diagnosis of NOx Sensor After Completion of Temperature Raising Process)

In the exhaust system according to the embodiment, the ECU 10 performs the temperature raising process for the filter 51a and NSR catalyst 50a for the above-described purposes. When the temperature raising process is performed, the exhaust gas having a relatively high temperature flows into the SCR catalyst 52a. Consequently, the temperature of the SCR catalyst 52a rises with the temperature raising process. When the temperature of the SCR catalyst 52a rises with the temperature raising process, a large part of the ammonia adsorbed in the SCR catalyst 52 tends to slip to the exhaust passage 5 downstream of the SCR catalyst 52a.

After performing the temperature raising process, the ECU 10 controls the supply of urea solution through the urea solution addition valve 54 so as to adjust the amount of ammonia adsorbed in the SCR catalyst 52a (which will also be referred to as the "ammonia adsorption amount" hereinafter) to a specific amount smaller than the saturated ammonia adsorption amount in order to quickly enable the removal of NOx by the SCR catalyst 52a. This control performed by the ECU 10 will be referred to as the "supply control after temperature raising process". The supply control after temperature raising process will be described in the following with reference to FIG. 3. In performing the supply control after temperature raising process, the ECU 10 functions as the controller according to the present disclosure.

FIG. 3 shows changes with time of a temperature raising process execution flag, the SCR catalyst temperature, a supply control after temperature raising process execution flag (also referred to as "supply control execution flag" hereinafter), the ammonia adsorption amount, and a flag for allowing diagnosis of the third NOx sensor (also referred to as "diagnosis allowance flag") when the temperature raising process and the supply control after temperature raising process are performed in the diagnosis of the third NOx sensor 57 according to the prior art disclosed in the cited literatures. In the graph showing the change with time of the SCR catalyst temperature in FIG. 3, temperature Ts is a threshold temperature to start the supply control after temperature raising process, and temperature Tcth is a specific SCR catalyst temperature at which ammonia slip can occur. In the graph showing the change with time of the ammonia adsorption amount in FIG. 3, adsorption amount Qa is the aforementioned specific amount. The specific amount Qa is, for example, the amount of ammonia necessary for removal of NOx by the SCR catalyst 52a.

As shown in FIG. 3, during the period from time t0 to time t1, the temperature raising process execution flag is 0, and the temperature raising process is not performed. When the temperature raising process execution flag changes to 1 at time t1, the temperature raising process is started. Before time t1, the supply of urea solution through the urea solution addition valve 54 is controlled by the ECU 10 so that the ammonia adsorption amount is kept equal to the specific amount Qa. This control is different from the supply control after temperature raising process performed after the end of the temperature raising process. In this control, the supply of urea solution is controlled according to the operation state of the internal combustion engine 1 so that the ammonia adsorption amount is kept equal to the specific amount Qa. This control will be referred to as the "normal supply control". While the ammonia adsorption amount is kept at the specific amount Qa by the normal supply control, a removal rate with the SCR catalyst 52a that is required in removing NOx flowing into the SCR catalyst 52 is maintained.

When the temperature raising process is started at time t1, the SCR catalyst temperature rises accordingly. The SCR catalyst temperature is the temperature estimated on the basis of the output value of the third temperature sensor 60. As the SCR temperature rises with the progress of the temperature raising process, the ammonia adsorption amount decreases from the specific amount Qa to almost zero, as shown in FIG. 3. On other words, substantially the entirety of ammonia adsorbed in the SCR catalyst 52a slips to the exhaust passage 5 downstream of the SCR catalyst 52a. This situation is an illustrative example, and possible situations are not limit to that in which the rise in the SCR catalyst temperature with the progress of the temperature raising process makes the ammonia adsorption amount almost zero.

At time t2 the temperature raising process execution flag is set to 0, and the temperature raising process is terminated. After the lapse of a certain delay time after the termination of the temperature raising process, the SCR catalyst temperature starts to fall. When the SCR catalyst temperature falls to temperature Ts at time t3, the supply control execution flag is set to 1 at that time, and the supply control after temperature raising process is started. Then, the ammonia adsorption amount starts to increase, as shown in FIG. 3. The aforementioned temperature Ts is an SCR catalyst temperature at which starting the supply control after temperature raising process causes the ammonia adsorption amount to start to increase (e.g. 380° C.). When the ammonia adsorption amount reaches the specific amount Qa at time t4, the supply control execution flag is set to 0 at that time, and the supply control after temperature raising process terminated. The supply control after temperature raising process may be programmed in such a way that urea solution is supplied through the urea solution addition valve 54 at a relatively high flow rate so that the ammonia adsorption amount is restored to the specific amount Qa as quickly as possible. This can recover the removal rate with the SCR catalyst 52 as quickly as possible.

It has been discovered that in consequence of the supply control after temperature raising process, the ammonia adsorbed in the SCR catalyst 52a is distributed along the direction of the exhaust gas flow in the SCR catalyst 52a in such an upstream-biased manner that a large part of ammonia is present in the upstream portion thereof. It has also been discovered that due to the aforementioned upstream-biased distribution, even when the SCR catalyst temperature reaches or exceeds the aforementioned specific temperature Tcth after the ammonia adsorption amount is adjusted to the specific amount Qa by the supply control after temperature raising process, it takes some time until ammonia adsorbed in the SCR catalyst 52a tends to slip into the exhaust passage 5 downstream of the SCR catalyst 52a.

In the prior art disclosed in the cited literatures, no consideration is given to the above-described distribution of the adsorbed ammonia. Thus, when the ammonia adsorption amount is made equal to the specific amount Qa, diagnosis of the third NOx sensor 57 is performed immediately, if the SCR catalyst temperature is equal to or higher than the specific temperature Tcth. This situation will be seen in the graph showing the change with time of the diagnosis allowance flag in FIG. 3, where the diagnosis allowance flag is changed from 0 to 1 at time t4 at which the ammonia adsorption amount reaches the specific amount Qa, because the SCR temperature is higher than the specific temperature Tcth. If the value of the diagnosis allowance flag is 1, diagnosis of the third NOx sensor 57 is allowed to be performed. According to the discovery made with the present disclosure, there is an upstream-biased distribution of the ammonia desorbed in the SCR catalyst 52a at time t4. For this reason, although the SCR catalyst temperature is higher than the specific temperature Tcth at time t4, ammonia adsorbed in the SCR catalyst 52a is not apt to slip to the exhaust passage 5 downstream of the SCR catalyst 52a. In the prior art disclosed in the cited literatures, diagnosis of the third NOx sensor 57 is allowed to be performed even in such a circumstance. If diagnosis of the third NOx sensor 57 is performed in such a circumstance, a wrong diagnosis is prone to be made.

(Process of Disallowing Diagnosis of NOx Sensor)

To solve the above problem, the ECU 10 is configured to disallow diagnosis of the third NOx sensor 57 until a certain length of time elapses since the ammonia adsorption amount is adjusted to the specific amount after slip of ammonia out of the SCR catalyst 52a with the temperature raising process. This process performed by the ECU 10 will be referred to as the "disallowing process". The disallowing process will be described in the following with reference to FIG. 4. In performing the disallowing process, the ECU 10 functions as the controller according to the present disclosure.

FIG. 4 shows changes with time of the temperature raising process execution flag, the SCR catalyst temperature, the supply control execution flag, the ammonia adsorption amount, an integration enabling flag for enabling the integration of the time over which the SCR catalyst temperature is equal to or higher than a first specific temperature described later (which will also be referred to as the "high temperature waiting time" hereinafter), the integrated time of the high temperature waiting time, the diagnosis allowance flag, and an execution flag for diagnosis of the third NOx sensor 57 (which will also be referred to as the "diagnosis execution flag" hereinafter), when the temperature raising process, the supply control after temperature raising process, and the disallowing process are performed. The changes with time of the temperature Ts and the adsorption amount Qa in FIG. 4 are the same as those described above with reference to FIG. 3. In the graph showing the change with time of the SCR catalyst temperature in FIG. 4, Tcth1 is the first specific temperature, and Tcth2 is a second specific temperature. The first specific temperature Tcth1 is, for example, a temperature at which ammonia adsorbed in the SCR catalyst 52a can be desorbed from adsorption sites, and as will be described later, ammonia adsorbed in the upstream portion of the SCR catalyst 52a can move downstream. The second specific temperature Tcth2 is a specific temperature higher than the first specific temperature Tcth1. In the graph showing the change with time of the integrated time in FIG. 4, time tath is a threshold time used to determine whether to allow or disallow diagnosis of the third NOx sensor 57.

In the control shown in FIG. 4, the temperature raising process and the supply control after temperature raising process are performed until time t4 in the same manner as in the case shown in FIG. 3. At time t4 at which the ammonia adsorption amount reaches the specific amount Qa, the integration enabling flag is changed to 1 to enable the integration of the high temperature waiting time. Moreover, at time t4, the above-described normal supply control is started so as to maintain the ammonia adsorption amount at the specific amount Qa. During the period from t5 to t6, over which the SCR catalyst temperature is equal to or higher than the first specific temperature Tcth1, the high temperature waiting time is integrated. In the graph showing the change with time of the integrated time in FIG. 4, time ta1 represents the length of time from time t5 to time t6. Likewise, the high temperature waiting time is integrated during the period from t7 to t8, over which the SCR catalyst temperature is equal to or higher than the first specific temperature Tcth1. In the same graph, time ta2 represents the length of time from time t7 to time t8. Furthermore, when the SCR catalyst temperature reaches the first specific temperature Tcth1 at time t9 after time t8, the integration of the high temperature waiting time is started again. The integrated time reaches the threshold time tath at time t10 during the integration of the high temperature waiting time. At that time t10, the integration enabling flag is changed to 0, and the integration of the high temperature waiting time is terminated. In the graph, time ta3 represents the length of time from time t9 to time t10. At time t10, the diagnosis allowance flag is changed from 0 to 1 to allow diagnosis of the third NOx sensor 57.

In the control shown in FIG. 4, the ECU 10 calculates the length of time $\Delta t$ from time t4 at which the ammonia adsorption amount is adjusted to the specific amount Qa by the supply control after temperature raising process to time t10 at which the integrated time of the high temperature waiting time reaches the threshold time tath, as a specific time. Diagnosis of the third NOx sensor 57 is disallowed until the specific time $\Delta t$ elapses after the ammonia adsorption amount is adjusted to the specific amount Qa by the supply control after temperature raising process. The effect of this process will be described in the following. In calculating the specific time, the ECU 10 functions as the controller according to the present disclosure.

As described above, in consequence of the supply control after temperature raising process, there is an upstream-biased distribution of ammonia adsorbed in the SCR catalyst 52a along the direction of the exhaust gas flow in the SCR catalyst 52a. Therefore, at time t4 at which the ammonia adsorption amount is adjusted to the specific amount Qa by the supply control after temperature raising process, a large part of ammonia is adsorbed in the upstream part of the SCR catalyst 52a. When the SCR catalyst temperature reaches or exceeds the first specific temperature Tcth1, the ammonia adsorbed in ammonia adsorption sites in the SCR catalyst 52a is apt to be desorbed from the adsorption sites. Therefore, in the period during which the SCR catalyst temperature is equal to or higher than the first specific temperature Tcth1, there is a tendency that ammonia adsorbed in adsorption sites in the upstream part of the SCR catalyst 52a is firstly desorbed from the adsorption sites.

The ammonia desorbed from adsorption sites can be adsorbed in other adsorption sites in the SCR catalyst 52a while flowing in the SCR catalyst 52a. The larger the number of the other adsorption sites present in the path in the SCR catalyst 52a through which the ammonia desorbed from certain adsorption sites flows with the exhaust gas is, the more the ammonia is apt to be adsorbed onto other adsorption sites. When ammonia is adsorbed in the upstream part of the SCR catalyst 52a, the ammonia desorbed from adsorption sites in the upstream part flows by a relatively large number of other adsorption sites until it flows out into the exhaust passage 5 downstream of the SCR catalyst 52a. In that case, the ammonia is apt to be adsorbed by other sites. Thus, if ammonia adsorbed in the upstream part of the SCR catalyst 52a is desorbed from adsorption sites in the upstream part, it tends to be adsorbed by other sites located downstream of the originally adsorbed sites, before it flows out to the exhaust passage 5 downstream of the SCR catalyst 52a.

As above, when the SCR catalyst temperature is made equal to or higher than the first specific temperature Tcth1, even though ammonia adsorbed in adsorption sites in the upstream part of the SCR catalyst 52a is desorbed from the originally adsorbed sites, the desorbed ammonia tends to be adsorbed in other sites located downstream of the originally adsorbed sites. As the ammonia flows in the SCR catalyst 52a with the exhaust gas, it is adsorbed and desorbed repeatedly to shift to the downstream part of the SCR catalyst 52a. When the SCR catalyst temperature is equal to or higher than the first specific temperature Tcth1, ammonia shifts in the SCR catalyst 52a as described above. In that sense, the first specific temperature Tcth1 may be considered to be a temperature that enables ammonia adsorbed in the upstream part of the SCR catalyst 52a to shift in the downstream direction, which is 320° for example.

As above, in the control shown in FIG. 4, ammonia shifts in the SCR catalyst 52a during the high temperature waiting time. When the integrated time of the high temperature waiting time becomes somewhat long, the ammonia locally adsorbed in the upstream part of the SCR catalyst 52a shifts to the downstream part of the SCR catalyst 52a. With such shift, ammonia is apt to slip to the exhaust passage 5 downstream of the SCR catalyst 52a. Specifically, when the integrated time of the high temperature waiting time reaches the threshold time tath, a state in which ammonia slip is apt to occur is established. In the control shown in FIG. 4, diagnosis of the third NOx sensor 57 is disallowed during a specific period of time (Δt in FIG. 4) after the ammonia adsorption amount is adjusted to the specific amount Qa by the supply control after temperature raising process until the ammonia adsorbed in the SCR catalyst 52a is apt to slip to the exhaust passage 5 downstream of the SCR catalyst 52a, in other words during the period in which ammonia slip is not apt to occur and in which a wrong diagnosis can be made. Therefore, a wrong diagnosis is prevented from being made.

In the control shown in FIG. 4, the diagnosis allowance flag is set to 1 at time t10 after the lapse of the specific period of time (Δt) since the adjustment of the ammonia adsorption amount to the specific amount Qa by the supply control after temperature raising process. Thereafter, when a condition for performing diagnosis of the third NOx sensor 57 is met, the diagnosis execution flag is changed from 0 to 1, and diagnosis of the NOx sensor 57 is performed. For example, the condition for performing diagnosis of the third NOx sensor 57 is met when the SCR catalyst temperature reaches or exceeds a specific temperature Tcth. In the control shown in FIG. 4, the diagnosis execution flag is changed from 0 to 1 and diagnosis of the third NOx sensor 57 is performed at time t11 at which the SCR catalyst temperature reaches the second specific temperature Tcth2. By setting the second specific temperature Tcth2 (e.g. 350° C.) higher than the first specific temperature Tcth1 as the aforementioned specific temperature Tcth of the SCR catalyst temperature, which serves as a condition for performing diagnosis of the third NOx sensor 57, diagnosis of the third NOx sensor 57 can be carried out with relatively high accuracy, because ammonia slip is more apt to occur when the SCR catalyst temperature is equal to or higher than the second specific temperature Tcth2. However, the aforementioned specific temperature Tcth is not limited to the second specific temperature Tcth2, but the first specific temperature Tcth1 may be used as the specific temperature Tcth. After the diagnosis allowance flag is set to 1, a process of raising the temperature of the SCR catalyst 52a may be performed by a known method so that the condition for performing diagnosis of the NOx sensor 57 is met. For example, this process may be raising the temperature of the exhaust gas discharged from the internal combustion engine 1 or adding fur1 through the fuel addition valve 53 so as to make the SCR catalyst temperature equal to or higher than the specific temperature Tcth.

As described above, the specific amount Qa may be set to the amount of ammonia that is necessary to remove NOx by the SCR catalyst 52a. This makes the quantity of ammonia slipping with diagnosis of the third NOx sensor 57 as small as possible while maintaining a removal rate required in removal of NOx flowing into the SCR catalyst 52a.

A control flow executed by the ECU 10 serving as the diagnosis apparatus for an NOx sensor according to the present disclosure will be described with reference to a flow chart shown in FIGS. 5A and 5B. FIGS. 5A and 5B shows a flow chart of the control flow according to this embodiment. In this embodiment, this flow is executed by the ECU 10 at predetermined calculation intervals repeatedly during the operation of the internal combustion engine 1. Control for performing the temperature raising process is also performed by the ECU 10 according to a known flow other than this flow at predetermined calculation intervals repeatedly during the operation of the internal combustion engine 1. When the control flow according to the embodiment is started, the temperature raising process execution flag nflgpn set in the control flow of the temperature raising process is read. The temperature raising process execution flag nflgpn is a flag that is set to 1 when the temperature raising process is being performed and to 0 when the temperature raising process is not being performed.

In the flow according to the embodiment, firstly in step S101, it is determined whether or not the temperature raising process execution flag nflgpn is 1. If an affirmative determination is made in step S101, the temperature raising process is in progress. Then, the ECU 10 executes the processing of step S102 next. If a negative determination is made in step S101, the ECU 10 executes the processing of step S103 next.

If an affirmative determination is made in step S101, then in step S102 a previous value flag nflgpo, which represents the previous value of the temperature raising process execution flag nflgpn is set to 1. With this setting of the previous value flag nflgpo, the temperature raising process execution flag nflgpn and the previous value flag nflgpo are both set to 1 when the temperature raising process is in progress. When this flow is executed for the first time after the termination of the temperature raising process, the temperature raising process execution flag nflgpn is set to 0, and the previous value flag nflgpo is set to 1.

Then, in step S103, it is determined whether or not the temperature raising process execution flag nflgpn is 0 and the previous value flag nflgpo is 1. If an affirmative determination is made in step S103, it means that this flow is executed for the first time after the termination of the temperature raising process. Then, the ECU 10 executes the processing of step S104 next. Thus, the processing of step S104 and the subsequent steps is executed only immediately after the termination of the temperature raising process. On the other hand, if a negative determination is made in step S103, the execution of this flow is terminated.

If an affirmative determination is made in step S103, then in step S104 the SCR catalyst temperature Tc is acquired. In step S104, the SCR catalyst temperature Ts is acquired on the basis of the output value of the third temperature sensor 60.

Then, in step S105, it is determined whether or not the SCR catalyst temperature Tc acquired in step S104 is equal to or lower than the threshold temperature Ts. The threshold temperature Ts is a threshold SCR catalyst temperature to start the supply control after temperature raising process, which is stored in the ROM of the ECU 10. If an affirmative determination is made in step S105, the ECU 10 executes the processing of step S106 next. This situation corresponds to the situation at time t3 in FIG. 4. On the other hand, if a negative determination is made in step S105, the ECU 10 returns to the processing of step S104.

If an affirmative determination is made in step S105, then the supply control after temperature raising process is performed in step S106. In the supply control after temperature raising process, the supply of urea solution through the urea solution addition valve 54 is controlled so as to adjust the ammonia adsorption amount to the specific amount Qa smaller than the saturated amount. The flow rate of urea solution in this process may be either a predetermined value stored in the ROM of the ECU 10 or a value determined according to the operation state of the internal combustion engine 1. Thus flow rate of the supplied urea solution may be controlled to be relatively large so that the ammonia adsorption amount is restored to the specific amount Qa as quickly as possible. After the supply control after temperature raising process is started, the time tp elapsed since the start of this control is counted.

Then in step S107, it is determined whether or not the elapsed time tp is equal to or larger than a threshold tpth. The threshold tpth is a threshold for determining whether or not the ammonia adsorption amount has reached the specific amount Qa. This threshold tpth may be predetermined, or when the flow rate of urea solution supplied by the supply control after temperature raising process is determined according to the operation state of the internal combustion engine 1, determined according to the flow rate of the supplied urea solution. When the ammonia adsorption amount before performing the supply control after temperature raising process is estimated by a known flow other than this flow, the threshold tpth may be determined taking account of the estimated ammonia adsorption amount. If an affirmative determination is made in step S107, the ECU 10 executes the processing of step S108 next. This situation corresponds to the situation at time t4 in FIG. 4. On the other hand, if a negative determination is made in step S107, the ECU 10 returns to the processing of step S106 to continue the supply control after temperature raising process.

If an affirmative determination is made in step S107, then normal supply control is performed in step S108. In the normal supply control, the supply of urea solution is controlled according to the operation state of the internal combustion engine 1 so as to maintain the ammonia adsorption amount at the specific amount Qa.

Then, in step S109, the SCR catalyst temperature Tc is acquired. The processing of step S109 is substantially the same as the processing of step S104 described above. Then, in step S110, it is determined whether or not the SCR catalyst temperature Tc acquired in step S109 is equal to or higher than the first specific temperature Tcth1. The first specific temperature Tcth1 is a temperature that enables ammonia adsorbed in the upstream part of the SCR catalyst 52*a* to shift in the downstream direction. The first specific temperature Tcth1 may be either a predetermined temperature stored in the ROM of the ECU 10 or temperature determined according to the operation state of the internal combustion engine 1. The higher the exhaust gas flow rate is, the more the ammonia adsorbed in the SCR catalyst 52*a* is apt to slip into the exhaust passage 5 downstream of the SCR catalyst 52*a*. Taking account of this, the higher the exhaust gas flow rate is, the lower the first specific temperature Tcth1 may be set. Thus, the tendency of ammonia slip that changes depending on the exhaust gas flow rate is taken into account. If an affirmative determination is made in step S110, the ECU 10 executes the processing of step S111 next. If a negative determination is made in step S110, the ECU 10 executes the processing of step S112 next.

If an affirmative determination is made in step S110, then the integrated value of the high temperature waiting time ta is calculated in step S111. In step S111, specifically, the time over which the SCR catalyst temperature Tc is equal to or higher than the first specific temperature Tcth1. This corresponds to the sum of the length of time from t5 to t6, the length of time from t7 to t8, and the length of time from t9 to t10 in FIG. 4.

Then, in step S112, it is determined whether or not the integrated value of the high temperature waiting time ta calculated in step S111 is equal to or larger than the threshold time tath. The threshold time tath is a threshold for determining whether to allow or disallow diagnosis of the third NOx sensor 57. This threshold time tath corresponds to the specific threshold according to the present disclosure. The threshold time tath may be either a predetermined threshold stored in the ROM of the ECU 10 or a threshold that is determined according to the operation state of the internal combustion engine 1. In this connection, the higher the exhaust gas flow rate is, the smaller the threshold time tath may be set. Thus, the tendency of ammonia slip that changes depending on the exhaust gas flow rate is taken into account. If an affirmative determination is made in step S112, the ECU 10 executes the processing of step S113 next. This situation corresponds to the situation at time t10 in FIG. 4. If a negative determination is made in step S112, the ECU 10 returns to the processing of step S109. The diagnosis allowance flag nflga continues to be initialized to 0 until it is set to 1 in the processing of step S113 described later. When the diagnosis allowance flag nflga is 0, diagnosis of the third NOx sensor 57 is disallowed. Therefore, diagnosis of the third NOx sensor 57 is disallowed during the specific period of time (corresponding to Δt in FIG. 4) from the time when the ammonia adsorption amount is adjusted to the specific amount Qa by the supply control after temperature raising process to the time when an affirmative determination is made in step S112.

If an affirmative determination is made in step S112, then the diagnosis allowance flag nflga is set to 1 in step S113. The diagnosis allowance flag nflga is a flag for allowing diagnosis of the third NOx sensor 57. When its value is set to 1, diagnosis of the third NOx sensor 57 is allowed to be performed.

Then, in step S114, it is determined whether or not the condition for performing diagnosis of the third NOx sensor 57 is met. In step S114, a determination as to whether or not diagnosis of the third NOx sensor 57 can be performed in step S115 (described later) is made on the basis of the concentration of ammonia slipping out of the SCR catalyst 52*a*. In step S114, the SCR catalyst temperature and the exhaust gas flow rate are acquired, and if, for example, the SCR catalyst temperature is equal to or higher than the specific temperature Tcth and the exhaust gas flow rate is equal to or higher than a threshold flow rate, an affirmative determination is made, namely it is determined that the condition for performing diagnosis of the third NOx sensor 57 is met. As described above, the specific temperature Tcth may be set to either the first specific temperature Tcth1 or the second specific temperature Tcth2. The threshold flow rate may be, for example, a value of the exhaust gas flow rate that enables the ammonia desorbed from the SCR catalyst 52*a* to flow into the exhaust passage 5 downstream of the SCR catalyst 52*a*. If an affirmative determination is made in step S114, the ECU 10 executes the processing of step S115 next. This situation corresponds to the situation at time t11 in FIG. 4. If a negative determination is made in step S114, the ECU 10 executes the processing of step S114 again.

If an affirmative determination is made in step S114, then diagnosis of the third NOx sensor 57 is executed in step S115. In step S115, diagnosis of the third NOx sensor is performed on the basis of the concentration of ammonia slipping out of the SCR catalyst. In step S115, for example, a determination as to failure of the third NOx sensor 57 is made. Alternatively, for example, responsiveness diagnosis for estimating the responsiveness of the third NOx sensor 57 is performed. Such diagnosis is performed by a known method based on the concentration of ammonia slipping out of the SCR catalyst 52*a*.

Then, in step S116, the previous value flag nflgpo, the diagnosis allowance flag nflga, and the integrated value of the high temperature waiting time ta are initialized to 0. After the completion of the processing of step S116, the execution of this flow is terminated.

By executing the above-described control flow, the diagnosis apparatus for an NOx sensor according to the present disclosure is prevented from making a wrong diagnosis in diagnosing the third NOx sensor 57.

Second Embodiment

A second embodiment of the present disclosure will be described with reference to FIG. 6. The components and processing in the second embodiment that are substantially the same as those in the above-described first embodiment will not be described in further detail.

FIG. 6 is a flow chart of a control flow according to the second embodiment. In this embodiment, the control flow shown in FIG. 6 is executed repeatedly by the ECU 10 at predetermined calculation intervals during the operation of the internal combustion engine 1.

In the flow shown in FIG. 6, after the processing of step S108, the processing of step S209 is executed, where a specific time tcr is calculated. The specific time tcr is a length of time from the time when the ammonia adsorption amount adjusted to the specific amount Qa by the supply control after temperature raising process to the time when the ammonia adsorbed in the SCR catalyst 52a tends to slip to the exhaust passage 5 downstream of the SCR catalyst 52a. In step S209, the specific time tcr is calculated on the basis of a model for simulating the adsorption state of ammonia in the SCR catalyst 52a. According to this model, the adsorption state of ammonia is estimated, for example, on the basis of the ammonia adsorption amount, the SCR catalyst temperature, and the exhaust gas flow rate. This method is merely an example, and the specific time tcr may be calculated by a known method.

Then, in step S210, it is determined whether or not the specific time tcr calculated in step S209 has elapsed from the time when the ammonia adsorption amount was adjusted to the specific amount Qa by the supply control after temperature raising process. If an affirmative determination is made in step S210, the ECU 10 executes the processing of step S113 next. If a negative determination is made in step S210, the ECU 10 executes the processing of step S210 again. Thus, diagnosis of the third NOx sensor 57 is disallowed to be performed until the specific time tcr elapses since the adjustment of the ammonia adsorption amount to the specific amount Qa by the supply control after temperature raising process.

By executing the above-described control flow, the diagnosis apparatus for an NOx sensor according to the present disclosure is prevented from making a wrong diagnosis in diagnosing the third NOx sensor 57.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A diagnosis apparatus for an NOx sensor applied to an exhaust system including a selective catalytic reduction NOx catalyst provided in an exhaust passage of an internal combustion engine to reduce NOx in exhaust gas by ammonia, a reducing agent supply device that adds ammonia or a precursor of ammonia as a reducing agent to exhaust gas upstream of said selective catalytic reduction NOx catalyst, an NOx sensor provided in said exhaust passage downstream of said selective catalytic reduction NOx catalyst, an exhaust gas purification device provided in said exhaust passage upstream of said selective catalytic reduction NOx catalyst, and a controller comprising at least one processor configured to perform a temperature raising process for raising the temperature of said exhaust gas purification device and control supply of said reducing agent by said reducing agent supply device after said temperature raising process is performed so as to make the ammonia adsorption amount defined as the amount of ammonia adsorbed in said selective catalytic reduction NOx catalyst equal to a specific amount smaller than the saturated amount of said ammonia adsorption amount, wherein said controller is further configured to:
perform diagnosis of said NOx sensor on the basis of the concentration of ammonia slipping out of said selective catalytic reduction NOx catalyst when the temperature of said selective catalytic reduction NOx catalyst is equal to or higher than a specific temperature; and
disallow diagnosis of said NOx sensor since said ammonia adsorption amount is made equal to said specific amount until a specific time elapses.

2. A diagnosis apparatus for an NOx sensor according to claim 1, wherein said specific amount is a value of said ammonia adsorption amount that is necessary for removal of NOx by said selective catalytic reduction NOx catalyst.

3. A diagnosis apparatus for an NOx sensor according to claim 1, wherein said controller is further configured to calculate said specific time on the basis of the temperature of said selective catalytic reduction NOx catalyst.

4. A diagnosis apparatus for an NOx sensor according to claim 2, wherein said controller is further configured to calculate said specific time on the basis of the temperature of said selective catalytic reduction NOx catalyst.

5. A diagnosis apparatus for an NOx sensor according to claim 3, wherein said controller calculates an integrated value of the time over which the temperature of said selective catalytic reduction NOx catalyst is equal to or higher than a specific first temperature after said ammonia adsorption amount is made equal to said specific amount by the controller and calculates said specific time as a time taken until said integrated value reaches or exceeds a specific threshold.

6. A diagnosis apparatus for an NOx sensor according to claim 4, wherein said controller calculates an integrated value of the time over which the temperature of said selective catalytic reduction NOx catalyst is equal to or higher than a specific first temperature after said ammonia adsorption amount is made equal to said specific amount by the controller and calculates said specific time as a time taken until said integrated value reaches or exceeds a specific threshold.

7. A diagnosis apparatus for an NOx sensor according to claim 5, wherein the higher the flow rate of exhaust gas discharged from said internal combustion engine is, the lower said first specific temperature is made.

8. A diagnosis apparatus for an NOx sensor according to claim 6, wherein the higher the flow rate of exhaust gas discharged from said internal combustion engine is, the lower said first specific temperature is made.

9. A diagnosis apparatus for an NOx sensor according to claim 5, wherein the higher the flow rate of exhaust gas discharged from said internal combustion engine is, the smaller said specific threshold is made.

10. A diagnosis apparatus for an NOx sensor according to claim 6, wherein the higher the flow rate of exhaust gas discharged from said internal combustion engine is, the smaller said specific threshold is made.

11. A diagnosis apparatus for an NOx sensor according to claim 1, wherein said controller performs diagnosis of said NOx sensor on the basis of the concentration of ammonia slipping out of said selective catalytic reduction NOx catalyst when the temperature of said selective catalytic reduction NOx catalyst is equal to or higher than a second specific temperature.

12. A diagnosis apparatus for an NOx sensor according to claim 2, wherein said controller performs diagnosis of said NOx sensor on the basis of the concentration of ammonia slipping out of said selective catalytic reduction NOx catalyst when the temperature of said selective catalytic reduction NOx catalyst is equal to or higher than a second specific temperature.

13. A diagnosis apparatus for an NOx sensor according to claim 3, wherein said controller performs diagnosis of said NOx sensor on the basis of the concentration of ammonia slipping out of said selective catalytic reduction NOx catalyst when the temperature of said selective catalytic reduction NOx catalyst is equal to or higher than a second specific temperature.

14. A diagnosis apparatus for an NOx sensor according to claim 4, wherein said controller performs diagnosis of said NOx sensor on the basis of the concentration of ammonia slipping out of said selective catalytic reduction NOx catalyst when the temperature of said selective catalytic reduction NOx catalyst is equal to or higher than a second specific temperature.

15. A diagnosis apparatus for an NOx sensor according to claim 5, wherein said controller performs diagnosis of said NOx sensor on the basis of the concentration of ammonia slipping out of said selective catalytic reduction NOx catalyst when the temperature of said selective catalytic reduction NOx catalyst is equal to or higher than a second specific temperature.

16. A diagnosis apparatus for an NOx sensor according to claim 6, wherein said controller performs diagnosis of said NOx sensor on the basis of the concentration of ammonia slipping out of said selective catalytic reduction NOx catalyst when the temperature of said selective catalytic reduction NOx catalyst is equal to or higher than a second specific temperature.

17. A diagnosis apparatus for an NOx sensor according to claim 7, wherein said controller performs diagnosis of said NOx sensor on the basis of the concentration of ammonia slipping out of said selective catalytic reduction NOx catalyst when the temperature of said selective catalytic reduction NOx catalyst is equal to or higher than a second specific temperature.

18. A diagnosis apparatus for an NOx sensor according to claim 8, wherein said controller performs diagnosis of said NOx sensor on the basis of the concentration of ammonia slipping out of said selective catalytic reduction NOx catalyst when the temperature of said selective catalytic reduction NOx catalyst is equal to or higher than a second specific temperature.

19. A diagnosis apparatus for an NOx sensor according to claim 9, wherein said controller performs diagnosis of said NOx sensor on the basis of the concentration of ammonia slipping out of said selective catalytic reduction NOx catalyst when the temperature of said selective catalytic reduction NOx catalyst is equal to or higher than a second specific temperature.

20. A method of diagnosing an NOx sensor applied to an exhaust system including a selective catalytic reduction NOx catalyst provided in an exhaust passage of an internal combustion engine to reduce NOx in exhaust gas by ammonia, a reducing agent supply device that adds ammonia or a precursor of ammonia as a reducing agent to exhaust gas upstream of said selective catalytic reduction NOx catalyst, an NOx sensor provided in said exhaust passage downstream of said selective catalytic reduction NOx catalyst, an exhaust gas purification device provided in said exhaust passage upstream of said selective catalytic reduction NOx catalyst, and a controller comprising at least one processor configured to perform a temperature raising process for raising the temperature of said exhaust gas purification device and control supply of said reducing agent by said reducing agent supply device after said temperature raising process is performed so as to make the ammonia adsorption amount defined as the amount of ammonia adsorbed in said selective catalytic reduction NOx catalyst equal to a specific amount smaller than the saturated amount of said ammonia adsorption amount, comprising the steps of:

diagnosing said NOx sensor on the basis of the concentration of ammonia slipping out of said selective catalytic reduction NOx catalyst when the temperature of said selective catalytic reduction NOx catalyst is equal to or higher than a specific temperature; and disallowing diagnosis of said NOx sensor since said ammonia adsorption amount is made equal to said specific amount by said controller until a specific time elapses.

* * * * *